United States Patent
Fu et al.

(10) Patent No.: US 6,929,070 B2
(45) Date of Patent: Aug. 16, 2005

(54) COMPOSITIONS AND METHODS FOR TREATING A SUBTERRANEAN FORMATION

(75) Inventors: Diankui Fu, Missouri City, TX (US); Frank Chang, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 421 days.

(21) Appl. No.: 10/191,179

(22) Filed: Jul. 9, 2002

(65) Prior Publication Data

US 2003/0139298 A1 Jul. 24, 2003

Related U.S. Application Data

(60) Provisional application No. 60/343,145, filed on Dec. 21, 2001.

(51) Int. Cl.[7] .............................................. E21B 43/27
(52) U.S. Cl. .................... 166/308.2; 166/300; 166/307
(58) Field of Search ................................ 166/271, 300, 166/304, 307, 308.2, 308.3

(56) References Cited

U.S. PATENT DOCUMENTS

| | | | | |
|---|---|---|---|---|
| 3,724,549 A | * | 4/1973 | Dill ............................ 166/282 |
| 4,324,669 A | | 4/1982 | Norman et al. ............ 252/8.55 |
| 4,591,447 A | | 5/1986 | Kubala ...................... 252/8.55 |
| 4,695,389 A | | 9/1987 | Kubala ..................... 252/8.553 |
| 5,979,557 A | | 11/1999 | Card et al. .................. 166/300 |
| 6,035,936 A | | 3/2000 | Whalen ...................... 166/308 |
| 6,258,859 B1 | | 7/2001 | Dahayanake et al. .......... 516/77 |
| 6,306,800 B1 | | 10/2001 | Samuel et al. ............... 507/129 |
| 6,367,548 B1 | * | 4/2002 | Purvis et al. ................ 166/281 |
| 6,399,546 B1 | | 6/2002 | Chang et al. ................ 507/240 |
| 6,497,290 B1 | * | 12/2002 | Misselbrook et al. ........ 166/384 |
| 2002/0004464 A1 | | 1/2002 | Nelson et al. ............... 507/200 |
| 2003/0119680 A1 | | 6/2003 | Chang et al. ................ 507/200 |

FOREIGN PATENT DOCUMENTS

| | | |
|---|---|---|
| GB | 2012837 | 8/1979 |
| WO | 01/29369 | 4/2001 |
| WO | WO03/054352 | 7/2003 |

OTHER PUBLICATIONS

SPE 56529 Case Study of a Novel Acid–Diversion Technique in Carbonate Reservoirs. F.F.Chang, T.Love, C.J.Affeld, J.B.Blevins III, R.L.Thomas, and D.K.Fu, 1998.

* cited by examiner

*Primary Examiner*—Zakiya Walker
(74) *Attorney, Agent, or Firm*—Thomas O. Mitchell; Robin Nava; Brigitta L. Echols (57) ABSTRACT

A method for diverting the majority of the fluid injected into a stratified subterranean formation, that has at least one problematic zone and at least one hydrocarbon zone, into the hydrocarbon zone includes injection of a viscous diverting fluid made with a gelling amount of a surfactant and an acid before the main treatment; after the treatment the acid decomposes the surfactant. The main treatment may be hydraulic fracturing, acid fracturing and matrix acidizing. The fluid used as the diverting fluid may also be used as the carrier fluid in hydraulic fracturing or gravel packing. Destruction of the surfactant alleviates the potential of diverters or carrier fluids to damage formations.

26 Claims, 4 Drawing Sheets

COMPOSITIONS AND METHODS FOR TREATING A SUBTERRANEAN FORMATION

REFERENCE TO RELATED PROVISIONAL APPLICATION

This application claims the benefit of provisional application Ser. No. 60/343,145 filed Dec. 21, 2001.

FIELD OF THE INVENTION

This invention relates to treatment of subterranean formations penetrated by wellbores. In particular, it relates to stimulation treatments such as fracturing, matrix acidizing and acid fracturing, of stratified formations having one or more layers that are problematic but oil-containing and one or more layers that are more permeable to oil or water than the problematic zone or zones. Most particularly it relates to compositions and methods for maximizing the amount of the treatment fluid that is injected into the problematic zones rather than into the more-permeable zones.

BACKGROUND OF THE INVENTION

In a wide variety of oilfield treatments, in which treatment fluids are injected into a formation through a wellbore, the formation being treated is stratified. Typically in such stratified formations, the permeabilities of the strata differ, sometimes substantially. Also, typically, one or more of the strata (which for simplicity we will call the oil-containing zone), will contain potentially producible hydrocarbon (oil, condensate, or gas). In this discussion we use the terms "oil-containing" and "hydrocarbon-containing" interchangeably and we use the terms "oil" and "hydrocarbon" interchangeably. Often one or more other strata (which for simplicity we will call the water-containing zone), will contain in its pores entirely, or almost entirely, only formation water or brine and will contain either no hydrocarbon or only residual hydrocarbon remaining after the producible hydrocarbon has already been produced from that zone. This zone will be a good producer of fluid that is all or mostly water. The other zone or zones will be considered problematic because they contain hydrocarbon that is not being produced properly. The zones that are producing fluid, either water or hydrocarbon or both, will be termed "non-problematic" here, even though water production is normally undesirable. By definition, here, the "problem" is that a zone is not producing or not producing satisfactorily, so by this definition a zone that is producing is "non-problematic". If both oil and water phases are present in a zone, but some or all of the producible oil has been produced, the zone will be considered a water-containing zone; in this case water is typically the continuous phase, and the flowing phase, and the water saturation is high. (However, if the formation is oil-wet, oil could be a thin continuous phase on the pore surfaces but water would still be the flowing phase.) Frequently, it is also true that the permeability to injected fluid of the water-containing zone is greater than the permeability to injected fluid of the oil-containing zone.

In other cases, there is no water-containing zone, but there is permeability stratification of the hydrocarbon-containing zones or strata. In such cases, oil will be produced preferentially from the more permeable zones, termed "non-problematic". The less permeable zone or zones will be considered problematic because again they contain hydrocarbon that is not being produced properly. They could be problematic because they are inherently less permeable (because of the geology) or because they have been damaged.

In many oilfield treatments, it is desirable to inject all or most of the injected fluid into one or more specific "problematic" oil-containing zones, i.e. stratum or strata that contain potentially producible hydrocarbon that is not or will not be satisfactorily produced, and not into other zones. These zones are "problematic" because they are oil-containing but are not or will not satisfactorily produce the hydrocarbon that they contain. In the situations under consideration here, production from these problematic zones is unsatisfactory because there are more-productive ("non-problematic") zones. These more productive zones may be water-containing zones that produce water. On the other hand, there may not be water zones, but the problematic zones may inherently have lower permeabilities than the other zones or may have been damaged in a drilling, completion or production process, so that some oil-containing zones can or will produce oil and others can or will not. For example, in hydraulic fracturing (including acid fracturing) an optimal treatment would place the fracture entirely in the problematic zone(s). Similarly, in acidizing treatments (of sandstone formations to remove damage, or of carbonate formations to create flow paths such as wormholes) an optimal treatment would be one in which all the injected fluid was placed in the problematic zone. These requirements are important because the objects of such treatments are to increase the permeability or the volume (or both) of the flow path for fluids in the problematic zone while not creating such increases in water-containing zones, or, if there are no water-containing zones, creating greater increases in the "problematic" zones than in the other zones. Furthermore, treatment fluid injected into a water-containing zone is at best "wasted" (and that zone is often thus called a "thief" zone) even if it does not enhance the flow path there. Worse, treatment fluid injected into a water-containing zone could increase water production. In practice, treatments often do not go primarily into the problematic zones.

In most of the following discussions, the "problematic" zones will be described as though they were problematic relative to water-containing zones, but it should be appreciated that problematic zones may be problematic relative to oil-containing zones. The zones into which it is desired to inject treatment fluids will normally be described as "oil-containing" zones even though in some cases all the zones, including the thief zones, are oil-containing. Typically, undiverted treatments enter thief zones having high water saturation (because the treatments are aqueous) and/or high permeability (because fluids follow the path(s) of least resistance). Methods devised to increase injection into the problematic oil-containing zone, even if it has lower permeability, are called diversion methods, and mechanical devices or chemicals used in them are called diverters. Only chemical diverters will be considered further here.

Some of the simple chemical diverting agents that have been used in the past include oil-soluble resins, water-soluble rock salt, and emulsions. A chemical diverter based on aqueous micellar viscoelastic surfactant gels was described in U.S. Pat. No. 5,979,557 which has a common assignee as the present application. This material will be called "VES Diverter". VES Diverter is used primarily in acidizing and fracturing; its use in acid diversion is described in Chang, et al, "Case Study of a Novel Acid-Diversion Technique in Carbonate Reservoirs," SPE paper 56529 (February, 1998). It can be used in both sandstones and carbonates. The surfactants described in U.S. Pat. No. 5,979,557 are amines, amine salts and quaternary amine salts, preferably erucyl bis(2-hydroxyethyl) methyl ammonium chloride, also known as N-cis-13-docosenoic-N,N-bis (2-hydroxyethyl)-N-methyl ammonium chloride. A salt (for example an inorganic salt of Ca, Mg, Zn, Al, or Zr) must be included in the fluid for the fluid to gel; VES Diverter may also include an optional water-soluble organic salt and/or alcohol to improve viscoelasticity under severe conditions.

Diversion with VES Diverter may be temporary or permanent. The micelles are broken by dilution by formation water or by contact with hydrocarbons, but the surfactant molecules remain intact. Some surfactants sometimes cause emulsions when they contact certain oils; if this occurs in fracturing or in carbonates it is unlikely to cause damage if the carbonate acidizing left large wormholes and if the fracturing left large flow paths; flow through these is unlikely to be impeded by the presence of emulsions. However, emulsions could impede flow through the smaller flow paths remaining after sandstone acidizing, or if small fractures or small wormholes were created.

It is also known to use self-diverting acids, typically consisting of hydrochloric acid mixed with a polymeric gelling agent and a pH-sensitive cross-linker, in matrix acidizing. Self-diverting acids are typically designed to gel at intermediate pH values, when the acid is partially spent. Self-diverting systems that are not based on cross-linked polymers but which rely upon viscoelastic surfactants are described in U.S. Pat. No. 4,695,389 (see also, U.S. Pat. No. 4,324,669, and British Patent No. 2,012,837, both cited there)—which has a common assignee as the present application. Viscoelastic surfactants based systems exhibit very low friction pressure and therefore are easy to pump and yet, form a gel downhole. U.S. Pat. No. 4,695,389 discloses a viscoelastic surfactant-based gelling agent intended for use in acid fracturing. The particularly preferred embodiment is a fluid comprised of N,N-bis(2-hydroxyethyl) fatty amine acetic acid salt (the gelling agent), an alkali metal acetate salt, acetic acid (the acid-which actually removes the damage from the formation), and water.

Another chemical diverter system based on VES technology has been described in U.S. Pat. No. 6,399,546 which has a common assignee as the present application. This material, called a "Viscoelastic Diverting Acid" (VDA), is typically made from surfactants made from betaines, which we will call BET surfactants, and others, that are described in U.S. Pat. No. 6,258,859. VDA fluids are used for diversion in acidizing or acid fracturing treatments. VDA fluids are made from mixtures of strong acids, such as HCl, and BET surfactants. These materials are ungelled when strongly acidic as pumped, but as the acid "spends" or is consumed, and the pH rises and the electrolyte content of the fluid increases (typically by introduction of calcium ions as a consequence of the dissolution of carbonates) the fluids gel. Thus, when first injected they enter the most permeable zone(s), but when they gel they block that zone and divert subsequently injected fluid into previously less-permeable zones.

Other improved self-diverting systems have been described in U.S. Pat. No. 6,399,546, having a common assignee as the present application. This application, hereby incorporated by reference, provides formulations, suitable for acid treatments, comprising an amphoteric surfactant that gels as the acid spends in the presence of an activating amount of a co-surfactant and of multivalent cations typically generated by the acid reaction with the formation. When the gelling agent is mixed in hydrochloric acid, the co-surfactant prevents the gelling of the solution; the solution gels when the pH increases above about 2.

GB Patent Application No. GB 0103449.5, assigned to the same assignee as the present application, describes cleavable surfactants containing chemical bonds such as acetals, amides or esters that can be broken by adjusting the pH. Examples show some that are broken by very dilute acetic acid (0.5 to 1%) at temperatures below about 60° C. and some that can be broken when the pH is raised above about 8. That application states that cleavable surfactants are useful in wellbore service fluids, especially fracturing fluids and well clean-out fluids.

Methods have been developed that would destroy the micellar structure of some VES fluids if they were being used as diverters. U.S. Patent Application Publication No. US 2002/0004464 A1, which has a common assignee as the present application, teaches that certain carboxylic acids, that have charges opposite to the VES's head group can act as breakers by destroying the micellar structure of the VES fluid. It also teaches that some organic acids, such as adipic, citric, or glutaric acids, in the protonated form can act as breakers. On the other hand, for certain surfactants, organic acid salts such as salicylates can be stabilizers. That application teaches that whether or not an organic acid acts as a VES breaker depends upon whether the surfactant is anionic, cationic, zwitterionic or nonionic. It focuses on breakers for viscoelastic surfactant systems based upon cationic surfactants such as erucyl methyl bis(2-hydroxyethyl) ammonium chloride and zwitterionic surfactants such as betaine surfactants and teaches only breakers that function by destroying the micellar structure of the VES fluid.

Often, diversion methods either cause damage by leaving behind particles, polymer, sludge, precipitates, surfactants, etc. and/or are expensive and complicated and/or require specialized equipment and facilities (for example to generate, monitor and control foams). Also, many chemical diverters cannot be used at high temperatures or are incompatible with some chemicals (such as strong acids or very low or very high salt concentrations). There exists a need for simple compositions and methods for diversion of injected fluids, especially acidic fluids, at high temperatures, in which the diverters are completely broken at predetermined times or conditions after the main treatment is completed. There is also a need for chemical diverter systems that after degradation do not leave behind decomposition products that are surfactants, polymers or crosslinked polymer fragments.

SUMMARY OF THE INVENTION

In one embodiment, before a well treatment of a stratified subterranean formation that is made up of at least one water-containing zone and at least one hydrocarbon-containing zone (which is not producing or not producing satisfactorily and so is called "problematic"), a diverting fluid is injected into the water-containing zone (which is producing and so is termed "non-problematic"). This procedure, which diverts subsequently-injected fluids in the well treatment into the hydrocarbon-containing zone is accomplished by injecting a diverting fluid that consists of at least an aqueous viscous gelled fluid made up of water, a gelling amount of a surfactant, and an acid. This diverting fluid preferentially enters the water-containing zone, and the acid decomposes the surfactant after the well treatment. In another embodiment, before a well treatment of a stratified subterranean formation that is made up of at least one hydrocarbon-containing zone that produces or can produce hydrocarbon (and so is termed "non-problematic") and at least one hydrocarbon-containing zone that does not or will not produce hydrocarbon satisfactorily (called a "problematic" zone), because for example it has inherently lower permeability or has been damaged during drilling, completion, or production, a diverting fluid is injected into the hydrocarbon-containing zone that produces hydrocarbon. This procedure, which diverts subsequently-injected fluids in the well treatment into the problematic hydrocarbon-containing zone is accomplished by injecting a diverting fluid that consists of at least an aqueous viscous gelled fluid made up of water, a gelling amount of a surfactant, and an acid. This diverting fluid preferentially enters the zone that produces (the "non-problematic" zone), and the acid decomposes the surfactant after the well treatment. This diverting fluid is a viscous high-temperature acid-degradable aqueous gel. In other embodiments, the surfactant decomposition mechanism is acid hydrolysis, the diverting fluid is substantially salt free, and the formation temperature exceeds 37° C.

In another embodiment, the surfactant has the following amide structure:

in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 5 carbon atoms; and Y is an electron withdrawing group. Preferably the electronic withdrawing group is a quaternary amine or an amine oxide. More preferably it is a betaine having the structure:

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Most preferably the surfactant is the betaine in which R is $C_{17}H_{33}$ or $C_{21}H_{41}$, and n=3 and p=1.

In other embodiments, the viscous high-temperature acid-degradable aqueous gels may contain one or more of at least a cosurfactant, an alcohol, a chelating agent, and an iron control agent. In yet another embodiment, when the non-problematic zone contains at least a residual amount of hydrocarbon, the method further includes injecting a mutual solvent prior to injecting the diverter fluid. The mutual solvent is preferably a low molecular weight ester, alcohol or ether; most preferably it is ethylene glycol monobutyl ether. The mutual solvent may be mixed with other materials such as water or diesel.

In yet other embodiments, the well treatment following the diverting step is hydraulic fracturing, acid fracturing, matrix acidizing, or matrix dissolution with a chelating agent.

In yet further embodiments, the fluid used in at least part of a gravel packing, hydraulic fracturing, acid fracturing, matrix acidizing, or matrix dissolution with a chelating agent treatment is the same fluid that is described above as a viscous high-temperature acid-degradable aqueous gel.

DETAILED DESCRIPTION OF THE INVENTION

We have identified a class of surfactants that has very valuable properties. In aqueous solutions these materials form viscous gels that are stable at high temperatures with or without added salts, cosurfactants, alcohols or chelating agents. Most importantly, these surfactants can form the gels in strong mineral acids and the acid concentration can be adjusted so that the gels are stable under oilfield treatment conditions just long enough to survive during the oilfield treatment and to act as chemical diverters during that treatment and then they decompose by the action of the acid to destroy the gel structure while not forming damaging decomposition products. The aqueous viscous high-temperature acid-degradable gels formed by these surfactants under these conditions can also be used as the main fluids in certain oilfield treatments, as will be described further later.

Key points are that these compounds can form gels that are difficult to hydrolyze even in strong acids and that they can provide diversion under salt free conditions. By "difficult to hydrolyze" we mean that hydrolysis at a given temperature and pH takes more than at least one hour longer than the oilfield treatment, as determined by reduction of the viscosity of the fluid to less than 50 cP at a shear rate of 100 $sec^{-1}$. By "diversion" of a fluid we mean that more of the fluid enters the hydrocarbon-zone(s) than would be expected from a simple calculation based on the relative permeabilities to the treatment fluid of the different strata. By "salt free" we mean that no salts, such as those commonly added to oilfield treatment fluids for the purposes of clay stabilization, VES formation, or density elevation, (such as but not limited to alkali metal, alkaline earth metal, ammonium or tetramethylammonium halides or formates) have been added in amounts normally necessary to achieve those or similar objectives. We do not mean that the only electrolytes are mineral acids.

Many surfactants are known to form viscous gels in aqueous solutions, although they usually require added salts and/or cosurfactants for the gels to be sufficiently viscous and stable to be useful under oilfield treatment conditions. Such gels and their uses are described, for instance in U.S. Pat. Nos. 6,306,800; 6,035,936; and 5,979,557. The aspect of the structure of the surfactants that are discussed here that makes these surfactants useful in the present invention is that they have chemical linkages, in particular amide linkages that are stabilized by nearby chemical functional groups. In particular, these surfactants have cationic or electron-withdrawing groups within about 2 atoms of the nitrogen. The first step in acid hydrolysis of amides is protonation of the amide functionality. The nearby electron withdrawing group inhibits this protonation and greatly slows the acid hydrolysis, whereas other surfactants that do not have this aspect to their structure are either too stable or too unstable in strong acids to be useful.

Several zwitterionic surfactants that have been found to be particularly useful in forming aqueous viscous high-temperature acid-degradable gels in any electrolyte concentration; these materials will form gels with no added salt or even in heavy brines. Two preferred examples are betaines called, respectively, BET-O and BET-E. The surfactant in BET-O-30 is shown below. It is designated BET-O-30 because as obtained from the supplier (Rhodia, Inc. Cranbury, N.J., U.S.A.) it is called Mirataine BET-O-30 because it contains an oleyl acid ester group (including a $C_{17}H_{33}$ tail group) and contains about 30% active surfactant; the remainder is substantially water, a small amount of sodium chloride, and isopropanol. An analogous material, BET-E-40, is also available from Rhodia and contains a erucic acid ester group (including a $C_{21}H_{41}$ tail group) and is 40% active ingredient, with the remainder again substantially water, a small amount of sodium chloride, and isopropanol. Below, these surfactants will be referred to as BET-O and BET-E (and generically as "BET surfactants"); in the examples, BET-O-30 and BET-E-40 were always used. The surfactants are supplied in this form, with an alcohol and a glycol, to aid in solubilizing the surfactant in water at these high concentrations, and to maintain it as a homogeneous fluid at low temperatures. In field use, after dilution, the amounts of the other components of the as-received materials are insignificant. BET surfactants, and others, are described in U.S. Pat. No. 6,258,859. According to that patent, cosurfactants may be useful in extending the brine tolerance, and to increase the gel strength and to reduce the shear sensitivity of the VES-fluid, especially for BET-O. An example is sodium dodecylbenzene sulfonate (SDBS). Betaines will gel aqueous solutions without the need for added salts, as is necessary for many other surfactants that form VES fluids.

Aqueous gelled systems based on BET-E decompose in about 4 to about 10% HCl at temperatures greater than or equal to about 93° C. in relatively short times (for example about 40 minutes to about 2 hours) by decomposition of the surfactant. This system maintains viscosity at higher temperatures than VES Diverter and then decomposes more rapidly. The stability of the surfactant (the time it takes for the surfactant to decompose at a given temperature) can be controlled by adjusting the acid concentration.

The methods and fluids of the invention can be used for chemical diversion before many oilfield treatments, for example, but not limited to matrix acidizing, matrix dissolution with chelating agents, acid fracturing (either as the aqueous gelled acid proppant laden fluid or as the pad), gravel packing, wellbore cleanout, or conventional (non-acid) fracturing (again either as the aqueous gelled proppant laden fluid or as the pad).

Viscous aqueous high-temperature acid-degradable gels made with these surfactants are particularly useful as diverters in hydraulic fracturing and in acidizing treatments (both acid fracturing and matrix acidizing). By "hydraulic fracturing" we mean a stimulation treatment routinely performed on oil and gas wells in low-permeability reservoirs, usually sandstone reservoirs. Specially engineered fluids are pumped at high pressure and rate into the reservoir interval to be treated, causing a vertical fracture to open. The wings of the fracture extend away from the wellbore in opposing directions according to the natural stresses within the formation. Proppant, such as grains of sand of a particular size, is mixed with the treatment fluid keep the fracture open when the treatment is complete. Hydraulic fracturing creates high-conductivity communication with a large area of formation and bypasses any damage that may exist in the near-wellbore area. By "acid fracturing" we mean fracturing treatments in which acid is introduced into the fracture; this is done in carbonate reservoirs. The acid can dissolve at least part of the rock; irregular etching of the fracture face and removal of some of the mineral matter result in the fracture not completely closing when the pumping is stopped, and the creation of flow channels. In acid fracturing, it is common to pump sequential stages of viscous fluids (to initiate fracture formation or to enhance fracture growth) and of acids. In theory, in such cases the acid fingers into the viscous fluid. These acid fingers etch away the carbonate formation only where the formation is exposed to an acid finger. By "matrix acidizing" we mean the treatment of a reservoir formation with a stimulation fluid containing a reactive acid. In sandstone formations, the acid reacts with the soluble substances in the formation matrix (such as carbonates from drilling or completion fluids that have invaded the matrix) to clean out or enlarge the pore spaces. In carbonate formations, the acid dissolves virtually the entire formation matrix with which it comes in contact. In each case, the matrix acidizing treatment improves the formation permeability to enable enhanced production of reservoir fluids. Matrix acidizing operations are ideally performed at high rate, but at treatment pressures below the fracture pressure of the formation. This enables the acid to penetrate the formation and extend the depth of treatment while avoiding damage to the reservoir formation.

By "sandstone" we mean a clastic sedimentary rock whose grains are predominantly sand-sized. The term is commonly used to imply consolidated sand or a rock made of predominantly quartz sand, although sandstones often contain feldspar, rock fragments, mica and numerous additional mineral grains, held together with silica or another type of cement. Sandstone formations may contain small amounts of carbonates. By "carbonate" we mean a class of sedimentary rock whose chief mineral constituents (typically 95% or more) are calcite (limestone) and aragonite (both $CaCO_3$) and dolomite [$CaMg(CO_3)_2$], a mineral that can replace calcite during the process of dolomitization. Carbonate formations can contain small amounts of sandstone.

In such treatments (which we will call "main" treatments to distinguish them from the diversion step) in addition to diversion, the viscous high-temperature acid-degradable gel fluids maximize the flowback rate of hydrocarbons after the treatments, maximize cleanup (removal of harmful components of the diverters or of the main treatment fluids), and simultaneously minimizing water production. It is recommended that the diversion be carried out so that the chemical diverter of the invention penetrates to a radial distance of at least 10% of the depth of invasion of the main treatment. We will call the fluid used in the main treatment the carrier fluid if the main treatment is hydraulic fracturing or gravel packing. By "carrier fluid" we mean a fluid that is used to transport materials into or out of the wellbore. Carrier fluids ideally have the ability to efficiently transport the necessary material (such as pack sand during a gravel pack), the ability to separate or release the materials at the correct time or place, and compatibility with other wellbore fluids while being nondamaging to exposed formations. If the main treatment is acid fracturing or acidizing, we will call the fluid used in the main treatment the "main" acid fluid.

When used in hydraulic fracturing the viscous high-temperature acid-degradable gels can be used before the pad (purely as a diverter below fracture pressure), in the pad, or in the fracturing fluid (the carrier fluid). (By "pad" we mean a fluid, that is used to initiate hydraulic fracturing, that does not contain proppant, or a fluid, that is used to initiate acid fracturing, that may not contain acid. Pads may be, and often are, viscosified.) Optionally, the viscous high-temperature acid-degradable gels may include a cosurfactant to increase viscosity or to minimize the formation of stable emulsions that contain components of crude oil. In hydraulic fracturing, in addition to diversion, limiting the inflow of formation water during and after a well turn around to maximize recovery of fracturing fluid and components thereof after a hydraulic fracturing treatment of a formation having a hydrocarbon zone and a water-bearing zone is particularly important.

In hydraulic fracturing the viscous high-temperature acid-degradable aqueous gel used as a chemical diverter is pumped into the formation. This fluid would have a viscosity in excess of 10 cp, and preferably at least 35 cp, e.g., from about 35 cp to about 500 cp, and more preferably at least 50 cp at 100 sec$^{-1}$ at bottom hole temperature. Since the fluid is water based, the mobility of the viscosifying surfactant into the pores of the water-bearing zone is greater than the mobility of the viscosifying surfactant into the oil or gas zone. In addition, the viscous surfactant system retains its viscosity on exposure to formation water but loses its viscosity on exposure to hydrocarbons. As a result, a plug of viscous fluid is placed selectively in the pore structure of water-containing zone(s), but not in the pore structure of the hydrocarbon-containing zone(s). Thereafter, the fracturing treatment is performed. When the fracturing treatment is turned around, the production of formation water is selectively retarded by this plug of viscous fluid, thus increasing the amount of fracturing fluid produced and in turn improving the fracture clean-up and maximizing the subsequent flow path for production of hydrocarbons. In an ideal treatment, no gel would enter the oil-containing zone and the gel in the water-containing zone would be permanent. In actuality, however, some gel may enter the oil-containing zone, and even if it does not, then some surfactant-containing fluid will. The acid degradation of the surfactant ensures that any blockage of the oil-containing zone, by gel or by an emulsion that might be formed by produced oil plus surfactant, will be eliminated. The acid also may remove near wellbore damage and further ensure flow continuity between the fracture and the wellbore. Even though the acid-degradation of the surfactant may also result in increased flow from the water-containing zone, the benefits obtained by the effects in the oil-containing zone will be more important.

It was stated above that the viscous surfactant system retains its viscosity on exposure to formation water but loses its viscosity on exposure to hydrocarbons. This is because the micellar system structure is destroyed very quickly by contact with only a small amount of hydrocarbon. However, although some VES gel micellar system structures are destroyed relatively rapidly by contact with formation water or other aqueous fluids, the viscous high-temperature acid-degradable aqueous gels of the present invention are not. This is because the easily destroyed VES systems are made with surfactants that form gels over only a narrow range of salt concentrations; influx of water dilutes the system and reduces the salt concentration to below that which is necessary to form gels. (Or, in some cases of very high-brine formation waters, increases the salt concentration above that at which the surfactant can gel.) However, the surfactants of the present system form gels over a very broad range of salinity, so dilution by formation water or other aqueous fluids does not break the micellar structure of the gels, unless the surfactant itself is diluted below the concentration at which it can form the micellar structure.

The preferred sequence of injection of fluids in sandstone acidizing is mutual solvent, then an optional brine spacer, then the viscous high-temperature acid-degradable gel, then an optional HCl preflush, then a HCl/HF main acid fluid, then a post flush. For carbonate, the preferred sequence is a mutual solvent, that may be mixed for example with diesel or water, then an optional brine spacer, then the viscous high-temperature acid-degradable gel, then HCl as the main acid fluid, then a post flush. (The viscous high-temperature acid-degradable gel may not always be optimally useful in carbonate formations because it could be difficult in the presence of carbonate to maintain a high enough HCl concentration for the hydrolysis of the surfactant to occur. Use could be limited to special situations where high acid concentrations—or volumes—and limited exposure to carbonate—in terms of time or surface area—are designed into the treatment so that enough acid remains to degrade the gel.) In either case, the HCl or HCl/HF may be used with organic acids such as acetic acid or formic acid. Mutual solvent, such as 10% ethylene glycol monobutyl ether, is used as the post flush to strip any oil wetting surfactant from the surface and leave it water wet. In sandstone, the HCl preflush is commonly a 5 to 15% HCl solution containing a corrosion inhibitor. It displaces Na$^+$ and K$^+$ and dissolves calcite (calcium carbonate). This prevents subsequent precipitation of sodium or potassium fluosilicates or calcium fluoride when HF is introduced, and saves more-expensive HF. The post flush (for oil wells a hydrocarbon like diesel, or 15% HCl; for gas wells, acid or a gas like nitrogen or natural gas) also isolates the reacted HF from brine that may be used to flush the tubing, as well as restoring a water-wet condition to the formation and to any precipitates that did form. If the post flush is a gas, the cleanup additives are put in the last HCl/HF stage. For either sandstone or carbonate acidizing, the sequence of stages may be repeated. In either case, the pre flush and/or post flush also help to minimize any incompatibilities between chemical diverters, treatment fluids, and oil. In matrix acidizing the goal is usually to create dominant wormholes that penetrate through the near-wellbore damaged area. For acidizing, the viscous high-temperature acid-degradable gel selectively blocks the pore structure in the water-bearing zone but does not block the pore structure of the hydrocarbon zone at the formation face and thus diverts the acid away from the water-bearing zone and into the hydrocarbon zone.

For acidizing, the viscous high-temperature acid-degradable gels of the present invention have a great advantage over other gelled fluids, including other gelled VES fluids, because they do not require salts for gelation. As has been noted, acidizing systems for sandstone acidizing include HF or an HF precursor. Fluoride ion precipitates in the presence of multivalent and even most monovalent metal cations. Therefore, diverter systems that require metal salts to gel (or rock salt used as a diverter) cannot be allowed to contact acids that contain fluoride. When using such diverters, spacers such as solutions of HCl, mutual solvent, acetic acid, or salts with organic cations such as ammonium chloride must be used to prevent contact between the diverter and the HF-containing treatment fluid. The aqueous viscous high-temperature acid-degradable gels of the present invention are excellent diverting agents for fluids containing HF or HF precursors because they can be formed using mineral acids, such as HCl, as the only electrolyte (thus no metal salts) so that precipitation of fluorides is reduced. Generation of cations from dissolution of the formation rock can be controlled by addition of appropriate sequestering or chelating agents. In fact, HF can be included in the aqueous gel compositions of the present invention.

The viscous high-temperature acid-degradable aqueous gels of the present invention can also be used as diverters for matrix dissolution by chelating agents, a treatment analogous to matrix acidizing. In matrix dissolution by chelating agents, fluids containing high concentrations of such chelating agents as ethylenediaminetetraacetic acid, hydroxyethylethylenediaminetriacetic acid or hydroxyethyliminodiacetic acid or their various salts, or mixtures of these acids and/or their salts, are injected into a carbonate matrix in order to dissolve a portion of the matrix, or are injected into a sandstone matrix to dissolve carbonate damage. These treatments can be performed over a very broad pH range, from about 2 to about 10. Commonly, the chelating agents or their salts are present in the treatment fluid at their upper solubility limit for the pH used. One preferred method of matrix dissolution by chelating agents is the use of such chelating agents in the presence of strong mineral acids such as HCl. Matrix dissolution by chelating agents is to be distinguished from other oilfield stimulation treatments, such as fracturing or acidizing, in which much smaller amounts of these chelating agents may be present as stabilizers or metal control agents.

VES Diverter requires an organic or inorganic salt to generate adequate viscosity. With too little salt, the system will not gel; too much salt acts as a breaker, although it is possible to stabilize some systems in high brine. Although the viscous high-temperature acid-degradable gel of the present invention can be made with no added salts, we have found that BET-O gels can be stabilized, even in brines containing up to at least about 80% $CaCl_2$ or about 160% $CaBr_2$, up to temperatures of about 135° C., by the addition of either a co-surfactant (such as sodium dodecyl benzene sulfonate) or a chelating agent (such as hydroxyethylethylenediaminetriacetic acid (HEDTA) or hydroxyethyliminodiacetic acid (HEIDA)) but not both. BET-E gels are stable to similar high brines even without stabilizers. Therefore, the viscous high-temperature acid-degradable gels are stable in acidizing and acid fracturing applications even when they are initially made salt free but the $Ca^{++}$ concentrations rise very high due to the dissolution of carbonates by the acid.

The VDA chemical diverter method based on VES technology is described in U.S. Pat. No. 6,399,546. The method uses BET surfactants with a co-surfactant (like the weak organic acid SDBS) and a very strong acid. This system is used as the main acid fluid in acid treatments. As long as the acid concentration, for example HCl, remains above a certain level, for example about 3% for one of the systems described in that patent, the system is a low viscosity fluid without an elongated micellar structure. As the acid reacts with carbonate and is consumed, the system gels. This is because in sufficiently high concentration HCl, protonated (cationic) amines in the surfactant repel one another and the protonated (neutral) co-surfactant does not prevent repulsion. However, as the HCl concentration decreases, both the protonated surfactant and the protonated cosurfactant deprotonate. Therefore, the repulsion is decreased and what repulsion remains is offset by the now anionic cosurfactant.

It should be understood that the viscous high-temperature acid-degradable aqueous gels of the invention may contain components in addition to water, surfactants and acids. Such additional components are, for example, conventional constituents that perform specific desired functions such as chelating agents for the control of multivalent cations, corrosion inhibitors, corrosion inhibitor aids, fluid loss additives, freezing point depressants, clay control agents, and the like. The fluids and methods of the invention may also be used with weaker acids. That is, some wellbore treatments, such as matrix acidizing or acid fracturing, may use organic acids such as formic acid or acetic acid and the like, instead of or with stronger mineral acids. The viscous high-temperature acid-degradable aqueous gels of the invention may be used to divert or to deliver such organic acid containing systems as mixtures of citric acid and boron trifluoride, or mixtures of organic acids and mineral acids such as HCl, HF, and boric acid.

The fluids and methods of the invention can be used at temperatures above which the surfactant decomposes in strong acid in a time that is long enough to complete the oilfield treatment but short enough to permit either the next step in a sequence of treatments or to begin flowback and production. For each surfactant/acid combination there is a temperature above which the gel will not remain sufficiently stable for sufficiently long for a given oilfield treatment to be performed. For each surfactant there is a temperature below which the decomposition is too slow for the treatment to be practical because even very high concentrations of mineral acid would not destroy the surfactant in a short enough time. For example, BET-E-40 is stable to 15% HCl for over 34 hours at 27° C.

The fluids and methods of the invention can be used with no added salts; that is the mineral acid alone would provide sufficient electrolyte concentration to create and stabilize micelles and thus form a viscous high-temperature acid-degradable gel. For example, BET-E-40 provides a satisfactory gel in concentrations of HCl of less than about 12 percent. On the other hand, addition of a salt such as KCl, NaCl, $CaCl_2$, $NH_4Cl$, etc. is permissible. The fluid gelled in brine is not sensitive to the brine concentration. Combinations of mineral acid and brine also give good viscous high-temperature acid-degradable gels.

The compositions of the present Invention are more environmentally friendly than compositions previously used, because injected fluids returned to the surface do not contain surfactants and the decomposition products do not include any materials that are not soluble in either water or oil. Furthermore, the decomposition products (for example the erucic acid and the amine formed by the hydrolysis of the surfactant of BET-E-40) are believed to be non-toxic to humans.

There are no restrictions on the order of addition of the components when the aqueous viscous high-temperature acid-degradable gelled fluids are being made up. The as-received surfactant mixture; water; mineral acid; alcohol, cosurfactant or chelating agent; and salt may be blended in any order either in the field or at a separate location. Alternatively, any combination of some of the components can be premixed on site or at a separate location and then (an)other component(s) may be added later. The fluids may be batch mixed or mixed on the fly. Standard mixing equipment and methods can be used; heating and special agitation are normally not necessary. Heating may be employed-under extremely cold ambient conditions. The exact amounts and specific surfactant or mixture to be used will depend upon the viscosity desired, the temperature of use, the time desired before the viscosity has dropped below a predetermined value, and other similar factors. The concentrations of the active ingredients of the as-received surfactants in the final fluids can vary between about 4% to about 15%, preferably about 5% to about 10%, most preferably from about 6% to about 7.5%.

A wide variety of co-surfactants, organic salts, esters and alcohols can be added in the formulation of the aqueous viscous high-temperature acid-degradable gelled fluids in order to affect the viscosity and gel stability (as distinguished from the surfactant stability). For example, cationic surfactants such as erucyl methyl bis(2-hydroxyethyl) ammonium chloride; amphoteric surfactants such as BET's themselves (for example, mixtures of BET's could be used); and anionic surfactants such as sodium dodecyl benzene sulfonate. The amphoteric and cationic surfactants, if used, are usually added in an amount of from about 0.5 to about 1.5 volume percent, preferably about 0.5 volume percent. The anionic surfactants, if used, are usually added in an amount of from about 0.1 to about 0.5 weight percent. Other suitable anionics are, for example, sodium naphthalene sulfonate, sodium alpha olefin sulfonates and branched or linear sodium dialkyl naphthalene sulfonates, such as sodium dibutyl naphthalene sulfonate. Non-ionic surfactants should not be used. Various organic acids may be added, for example formic acid, acetic acid, propionic acid and glutaric acid. Such acids, if used, are typically added in amounts of 20 volume percent or less, preferably about 2 to about 10 volume percent. Salts of fatty acids should not be used. Esters may also be added, for example dimethyl glutarate in an amount of up to about 6 volume percent. Alcohols may also be added; preferred alcohols are methanol, propylene glycol and ethylene glycol. Other alcohols that may be used are ethyl alcohol and propyl alcohol. Alcohols, if added, are added in an amount up to about 10 volume percent, preferably in an amount of about 1 to about 6 volume percent.

As is usually the rule for acid treatments, the formulation will typically comprise corrosion inhibitors, most preferably small amounts of acetic acid for example at a concentration of about 0.2% to about 1.0%, and corrosion inhibitor aid, formic acid, for example at a concentration of about 1% to about 2%, or corrosion inhibitors based on quaternary amines for example at a concentration of about 0.2% to about 0.6%. A preferred corrosion inhibitor for the BET systems is acetic acid. Further agents may typically be added such as for instance non-emulsifiers, iron reducing agents, and chelating agents. It should be noted that, although no tests have been run, the formulation of the present invention is expected to be sensitive to iron, in particular to ferric ions at a concentration of about 2000 ppm (parts per million) or more. A preflush treatment with iron reducing agent and chelating agent is therefore recommended before the acid treatment. Though the formulation of the invention is compatible with small concentrations of non-emulsifying agents, to prevent emulsion and sludge, it is also a good practice to preflush the well with a mutual solvent, preferably low molecular weight esters, ether and alcohols, and more preferably ethylene glycol monobutyl ether. All other additives normally used in oilfield treatment fluids, such as, but not limited to, corrosion inhibitor aids, scale inhibitors, biocides, leak-off control agents, gravels, proppants, and others can also be included in the viscous high-temperature acid-degradable gelled aqueous fluids as needed, provided that none of them disrupts the structures giving rise to the surfactant gels to the point where they no longer give stable high viscosity gels under the conditions at which they are needed.

Most importantly, unlike the VES Diverter described in U.S. Pat. No. 5,979,557, the formulations of the present invention do not require oil or mutual solvent to flow back from the formation for the viscous high-temperature acid-degradable gel to break in the oil zone. Therefore, if there is some gel formed in the oil zone, the system can be designed to break before flow back of mutual solvent and/or oil progresses to the point where either of these materials is in contact with the gel. The gel in the water zone may also be broken by dilution if there is water flow, but although the likelihood of damage by VES-based diverters is generally very low, the compositions and methods of the present invention guarantee that there will be no damage done to the oil zone by emulsion or sludge formation. Breaking of the gel by dilution is a much less efficient process than destruction of the surfactant by acid, so flow of formation water into the gel in the water zone could delay breaking of the surfactant in the water zone by the acid (by diluting the acid) and thus prolong rather than reduce the diverting action. If no breaker is used, there is the potential for greater oil production because gel may remain in the water zone, but there is also the risk of decreased (or not increased) production because of gel in the oil zone. With the acid, the potential increase in oil production might or might not be lower, but the risk of a failure to increase oil production will be extremely low.

The system is adjusted so that the break time is greater than the pump time. The break time will be a function of the choice of surfactant and its concentration; the temperature; the choice of acid and its concentration; the ionic concentration and the nature of both the anions and cations, including ionized forms of other additives such as chelating agents, if present; and the nature and amount of alcohol present. However, for a given surfactant type, for example BET-O vs. BET-E, the stabilities are expected to be about the same (as a function for example of time, temperature and acid concentration) because they have the same electron withdrawing group in the degradable chemical functionality. Surfactants having different electron withdrawing groups will give different ranges of stabilities.

Variation in the amount of acid acting as surfactant breaker can be used to control the time at which the viscous high-temperature acid-degradable gel breaks at a given temperature. There will be a certain range of acid concentrations, for example from about 4% up to about 7%, for BET-E, at which the gel strength will be about the same at a given temperature, but the time to break will decrease with increasing acid concentration. Above that acid concentration, the gel will break too quickly to serve some functions. At an even higher acid concentration, no gel will form. At too low an acid concentration, for a given temperature, the gel will be stable for much longer than the time it would take to perform a wellbore operation and then desire to begin hydrocarbon production. Although the data are not given here, at low enough concentrations to be useful, these fluids are not expected to provide viscosities above about 50 cP at 100 sec$^{-1}$ at temperatures of above about 150° C. for times long enough to perform oilfield treatments. For a given surfactant and surfactant concentration, depending upon what other components are present in the fluid, there will be a temperature above which the surfactant will not be stable even in the absence of a mineral acid added to decompose it A viscous high-temperature acid-degradable gel containing 3% BET-E (active concentration)+7% HCl+1% methanol plus corrosion inhibitors will have a lifetime of about 100 minutes at 66° C. (The lifetime being defined as the time before the viscosity of the gel falls below about 50 cP at a shear rate of 170 sec$^{-1}$.) A similar gel in 4% HCl will have a lifetime of more than 180 minutes at the same temperature. At 88° C., a viscous gel containing 3% BET-E+2% HCl+1% methanol plus corrosion inhibitors was shown to have a lifetime of about 240 minutes. A similar gel in 4% HCl had a lifetime of only about 90 minutes at 88° C. Of course, different systems having different surfactants and different concentrations of surfactant, acid and other additives will have different lifetimes at different temperatures as can readily be determined by simple experimentation.

Other important uses for these fluids include fracturing (in the pad and in the fracture fluid), acid fracturing (in the pad or in stages that alternate with acid stages), diversion, fluidloss pills, kill pills, temporary selective water shutoff, cementing and other oilfield treatment uses. Viscosities of at least about 30 to about 50 cP measured at a shear rate of 100 sec$^{-1}$ are preferred for these uses. Although the uses are described in terms of producing wells for oil and/or gas, the fluids and methods may also be used for injection wells (such as for enhanced recovery or for storage or disposal) or for production wells for other fluids such as carbon dioxide or water.

EXAMPLE 1

Viscous high-temperature acid-degradable aqueous gels were made by mixing 7.5 volume percent as received BET-E-40 (therefore 3 percent active ingredient surfactant BET-E); varying amounts of concentrated (37 percent) HCl, 0.6 percent of a high temperature corrosion inhibitor mixture of formic acid, phenyl ketones and quaternary amines (hereinafter called corrosion inhibitor A); 2.0 percent of 85 percent formic acid as additional corrosion inhibitor (hereinafter called corrosion inhibitor B); and 1 percent methanol. These gels were then heated to 88° C., held at that temperature for varying amounts of time, cooled to room temperature, and observed. The results are shown in Table 1.

TABLE 1

| Time (min) | 7% HCl | 4% HCl | 2% HCl |
| --- | --- | --- | --- |
| 15 | Viscous | Viscous | Viscous |
| 30 | Viscous | Viscous | Viscous |

TABLE 1-continued

| Time (min) | 7% HCl | 4% HCl | 2% HCl |
|---|---|---|---|
| 45 | Less viscous | Viscous | Viscous |
| 60 | Water-like | Viscous | Viscous |
| 90 | Phase separation | Less viscous | Viscous |
| 120 | | Less viscous | Viscous |
| 180 | | Phase separation | Viscous |

The table shows that the fluid becomes more unstable with increasing HCl concentration.

The viscosities of the cooled fluids of column 2 of Table 1 were measured with a Fann 35 viscometer. The results are shown in Table 2 for two different shear rates at room temperature.

TABLE 2

| Time (min) | 170 sec$^{-1}$ | 510 sec$^{-1}$ |
|---|---|---|
| 0 | 285 | 115 |
| 15 | 288 | 115 |
| 30 | 255 | 110 |
| 45 | 240 | 105 |
| 90 | 84 | 70 |
| 120 | 75 | 35 |

The sample of the same fluid was heated to 66° C., held at that temperature for varying amounts of time, cooled to room temperature, and observed. The viscosities of the cooled fluids were measured with a Fann 35 viscometer. The results are shown in Table 3 for two different shear rates at room temperature.

TABLE 3

| Time (min) | 170 sec$^{-1}$ | 510 sec$^{-1}$ |
|---|---|---|
| 15 | 294 | 127 |
| 30 | 303 | 125 |
| 45 | 297 | 128 |
| 60 | 315 | 130 |
| 90 | 303 | 128 |
| 120 | 294 | 123 |
| 180 | 225 | 122 |

These data show that this fluid, containing 4% concentrated HCl, is very stable at this temperature, even at relatively high shear rates.

EXAMPLE 2

The following fluids were prepared by mixing 7.5% by volume of BET-E-40 with 5–10% by weight of either potassium chloride or ammonium chloride.

Fluid 1: 7.5 volume per cent as received BET-E-40 and 5 percent potassium chloride; pH adjusted to 9.58 with sodium hydroxide.

Fluid 2: 7.5 volume percent as received BET-E-40 and 5 percent potassium chloride; pH adjusted to 6.52 with sodium hydroxide.

Fluid 3: 7.5 volume percent as received BET-E-40 and 10 percent potassium chloride; pH adjusted to 6.79 with sodium hydroxide.

Fluid 4: 7.5 volume percent as received BET-E-40 and 10 percent potassium chloride; pH adjusted to 7.81 with sodium hydroxide.

Fluid 5: 7.5 volume percent as received BET-E-40 and 5 percent ammonium chloride; pH adjusted to 7.40 with sodium hydroxide.

Fluid 6: 7.5 volume percent as received BET-E-40 and 7 percent ammonium chloride; pH adjusted to 7.78 with sodium hydroxide.

The viscosities of these materials were measured in a Fann 50 viscometer while they were being heated to about 150° C.; the results are shown in Tables 4, 5 and 6. The temperatures listed are plus or minus about 2° C. These data show the behavior of fluids in the absence of added mineral acids.

TABLE 4

| | Fluid 1 | | | Fluid 2 | | |
|---|---|---|---|---|---|---|
| ° C. | 40 sec$^{-1}$ | 100 sec$^{-1}$ | 170 sec$^{-1}$ | 40 sec$^{-1}$ | 100 sec$^{-1}$ | 170 sec$^{-1}$ |
| 25 | 336 | 213 | 164 | 373 | 239 | 185 |
| 37 | 547 | 290 | 201 | 523 | 271 | 185 |
| 53 | 560 | 278 | 185 | 457 | 237 | 162 |
| 67 | 269 | 166 | 126 | 231 | 125 | 88 |
| 80 | 308 | 135 | 83 | 310 | 137 | 86 |
| 94 | 380 | 156 | 93 | 380 | 156 | 94 |
| 108 | 444 | 198 | 124 | 444 | 199 | 125 |
| 121 | 330 | 193 | 142 | 276 | 185 | 147 |
| 135 | 178 | 98 | 70 | 111 | 80 | 66 |
| 149 | 106 | 57 | 39 | 55 | 31 | 22 |

TABLE 5

| | Fluid 3 | | | Fluid 4 | | |
|---|---|---|---|---|---|---|
| ° C. | 40 sec$^{-1}$ | 100 sec$^{-1}$ | 170 sec$^{-1}$ | 40 sec$^{-1}$ | 100 sec$^{-1}$ | 170 sec$^{-1}$ |
| 25 | 361 | 239 | 188 | 324 | 219 | 175 |
| 37 | 527 | 280 | 194 | 406 | 250 | 189 |
| 53 | 433 | 236 | 166 | 432 | 224 | 153 |
| 67 | 196 | 114 | 84 | 180 | 90 | 61 |
| 80 | 271 | 121 | 76 | 241 | 105 | 65 |
| 94 | 322 | 133 | 80 | 286 | 118 | 70 |
| 108 | 412 | 178 | 109 | 355 | 155 | 96 |
| 121 | 309 | 193 | 147 | 252 | 162 | 126 |
| 135 | 148 | 105 | 86 | 124 | 87 | 71 |
| 149 | 78 | 48 | 36 | 68 | 40 | 30 |

TABLE 6

| | Fluid 5 | | | Fluid 6 | | |
|---|---|---|---|---|---|---|
| ° C. | 40 sec$^{-1}$ | 100 sec$^{-1}$ | 170 sec$^{-1}$ | 40 sec$^{-1}$ | 100 sec$^{-1}$ | 170 sec$^-$ |
| 25 | 324 | 174 | 122 | 279 | 174 | 132 |
| 37 | 423 | 222 | 153 | 397 | 205 | 140 |
| 53 | 238 | 153 | 118 | 164 | 124 | 106 |
| 67 | 255 | 118 | 76 | 221 | 101 | 64 |
| 80 | 279 | 119 | 73 | 235 | 99 | 60 |
| 94 | 344 | 144 | 87 | 298 | 123 | 74 |
| 108 | 376 | 197 | 136 | 273 | 174 | 134 |
| 121 | 199 | 142 | 117 | 157 | 98 | 74 |
| 135 | 112 | 73 | 56 | 85 | 42 | 28 |
| 149 | 69 | 36 | 25 | 41 | 19 | 12 |

It can be seen that all these fluids behave very similarly. They each have one maximal viscosity at about 37° C. and another at about 108° C., above which the viscosities gradually decrease. They are quire insensitive to the nature or the concentration of the added salt. All are shear thinning throughout the temperature and shear rate ranges explored, and all show appreciable viscosity throughout those ranges.

The following fluid was prepared by mixing:
Fluid 7: 7.5 volume percent as received BET-E-40, 15 percent concentrated (37 percent) HCl, 10 per cent methanol, 0.6 percent of corrosion inhibitor A, and 2 percent of corrosion inhibitor B. This fluid was then aged at 54° C. for a specified time. The fluid was then cooled, and a sufficient amount of CaCO$_3$ was added to react with all the acid. The pH of the fluid after this reaction with the acid was from about 4.2 to about 4.6. The viscosity of the fluid samples was then measured in a Fann 50 viscometer while they were being heated to about 150° C.; the results are shown in Tables 7 and 8.

TABLE 7

| Aged for: | 1 hour | | | 2.5 hours | | |
|---|---|---|---|---|---|---|
| ° C. | 40 sec$^{-1}$ | 100 sec$^{-1}$ | 170 sec$^{-1}$ | 40 sec$^{-1}$ | 100 sec$^{-1}$ | 170 sec$^{-1}$ |
| 25 | 757 | 494 | 386 | 849 | 530 | 403 |
| 37 | 797 | 403 | 271 | 929 | 449 | 294 |
| 53 | 1203 | 570 | 369 | 1183 | 550 | 353 |
| 67 | 1022 | 684 | 542 | 807 | 531 | 417 |
| 80 | 643 | 282 | 175 | 655 | 278 | 169 |
| 94 | 736 | 344 | 221 | 727 | 344 | 223 |
| 108 | 380 | 286 | 243 | 369 | 280 | 239 |
| 121 | 167 | 141 | 129 | 158 | 126 | 111 |
| 135 | 80 | 58 | 48 | 95 | 63 | 50 |
| 149 | 51 | 32 | 24 | 68 | 37 | 26 |

TABLE 8

| Aged for: | 8 hours | | | 24 hours | | |
|---|---|---|---|---|---|---|
| ° C. | 40 sec$^{-1}$ | 100 sec$^{-1}$ | 170 sec$^{-1}$ | 40 sec$^{-1}$ | 100 sec$^{-1}$ | 170 sec$^{-1}$ |
| 25 | 724 | 429 | 317 | 574 | 322 | 230 |
| 37 | 963 | 502 | 344 | 274 | 193 | 158 |
| 53 | 517 | 307 | 227 | 218 | 93 | 57 |
| 67 | 514 | 224 | 139 | 191 | 106 | 75 |
| 80 | 563 | 235 | 141 | 102 | 59 | 43 |
| 94 | 449 | 276 | 208 | 70 | 30 | 18 |
| 108 | 155 | 127 | 113 | 62 | 25 | 15 |
| 121 | 104 | 66 | 51 | 104 | 66 | 51 |
| 135 | 59 | 28 | 18 | 59 | 28 | 18 |
| 149 | 49 | 20 | 12 | | | |

The data in Tables 7 and 8 show that this fluid is degraded only slowly even in 15 per cent HCl at 54° C. Even after 8 hours exposure, this fluid still had a viscosity of over 50 cP at 100 sec$^{-1}$ at 121° C. and had a viscosity of 20 cP at 100 sec$^{-1}$ at 149° C.

EXAMPLE 3

The fluid of Example 1 containing 7 percent HCl was heated at 88° C. and at 66° C., held at those temperatures for varying amounts of time, cooled to room temperature, and observed. The viscosities of the cooled fluids were measured with a Fann 35 viscometer. The results are shown in Table 9 for each aging temperature at a shear rate of 170 sec$^{-1}$ at room temperature.

TABLE 9

| Time (Minutes) | Aged at 88° C. | Aged at 66° C. |
|---|---|---|
| 15 | 321 | 321 |
| 30 | 318 | 309 |
| 45 | 312 | 336 |
| 60 | 165 | 336 |
| 90 | 42 | 294 |
| 120 | 21 | 99 |
| 180 | 6 | 60 |

The data in Examples 1 through 3 clearly show that these fluids can be stable in strong mineral acids at high temperatures for long enough to perform many oilfield operations and that they then degrade. The higher the mineral acid concentration, or the higher the temperature, the more rapidly the surfactant decomposes and the shorter the time before the fluid decomposes and any undesired effects are eliminated. Equipment was not available to these highly acidic fluids at temperatures above about 88° C. or to measure their viscosities above room temperature.

EXAMPLE 4

Figure 1:
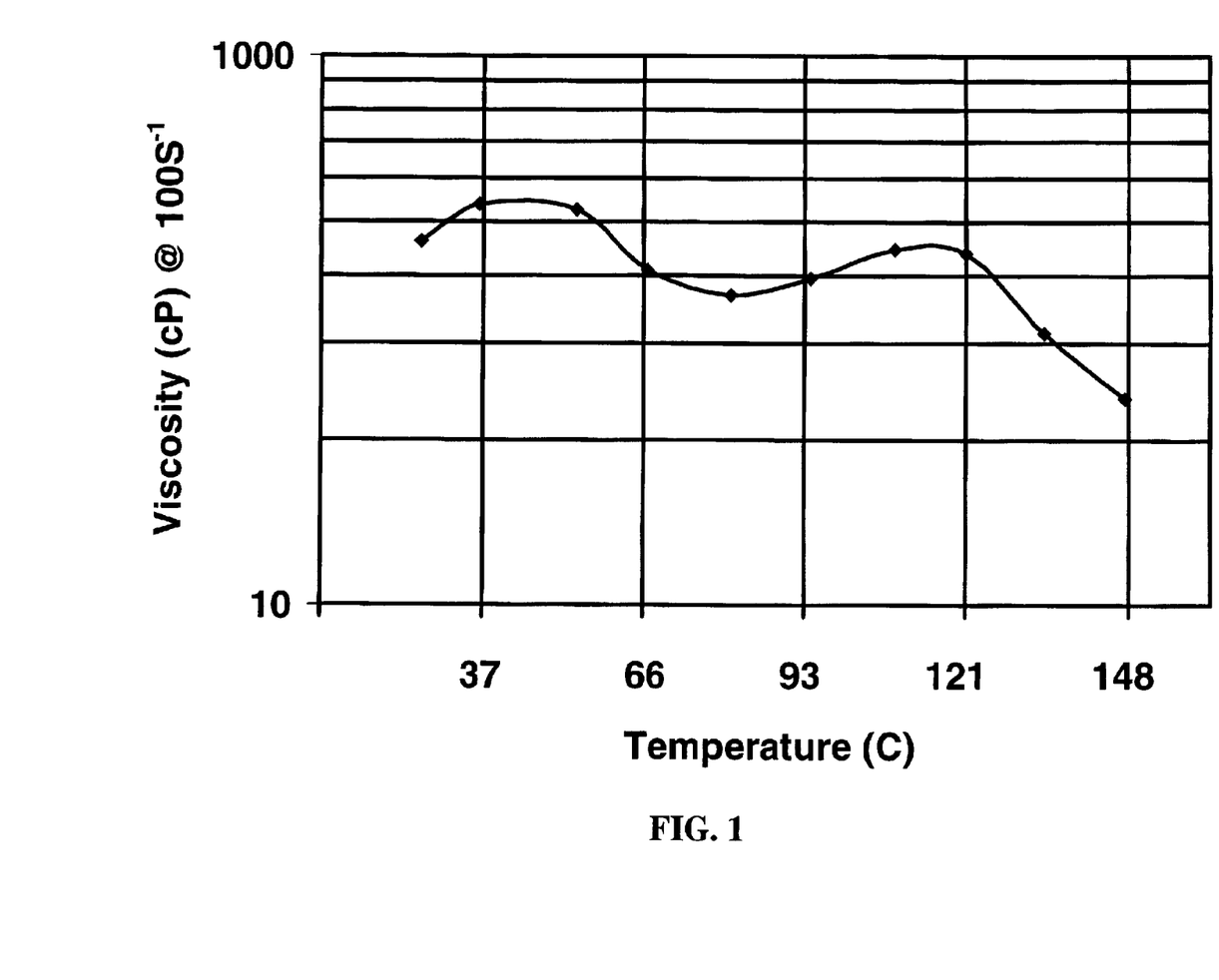
FIG. 1 shows the initial viscosity of a viscous high-temperature acid-degradable aqueous gel comprising 7.5% as-received BET-E-40, 5% KCl and 2% HCl vs. temperature.
Figure 2:
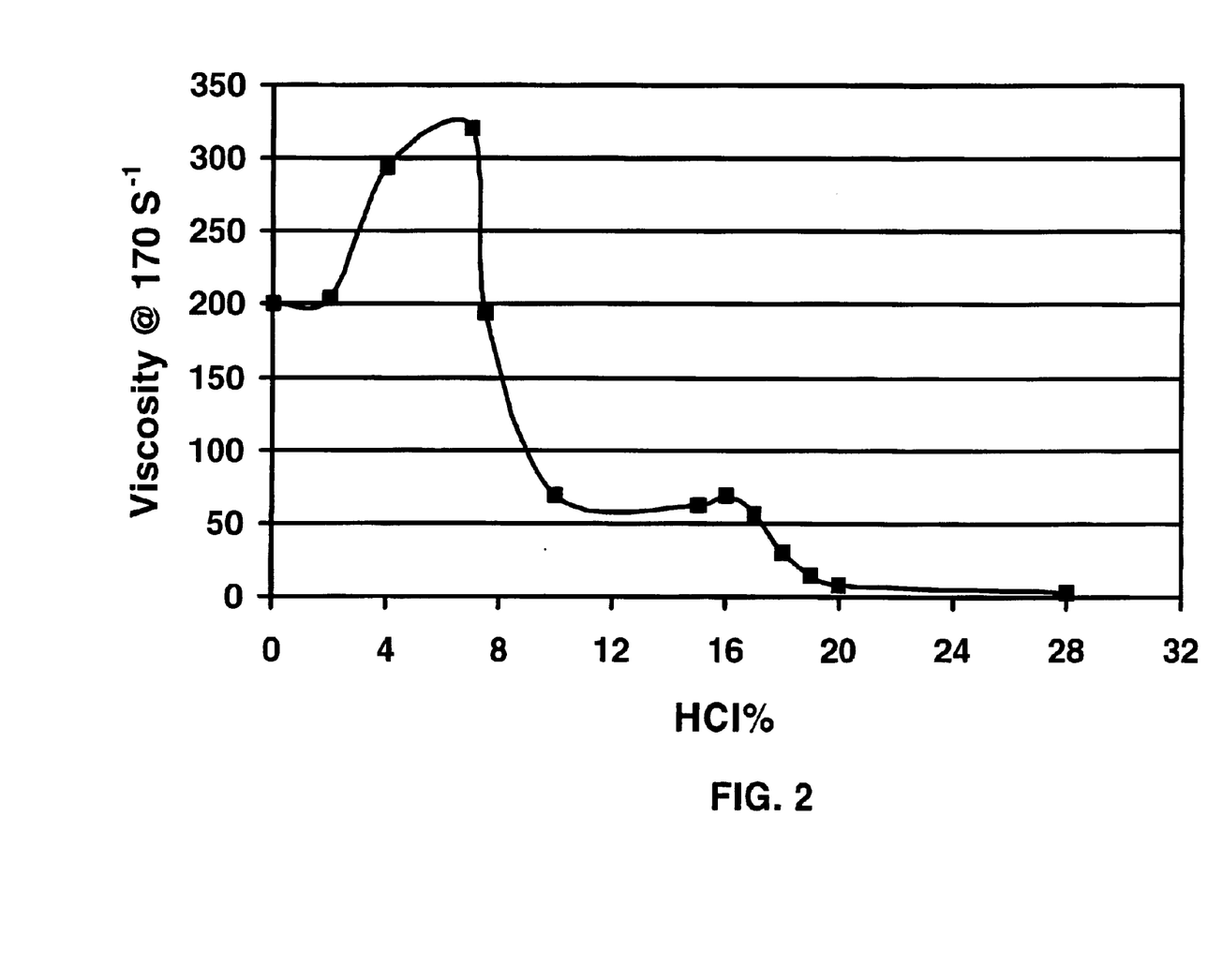
FIG. 2 shows the initial viscosity of viscous high-temperature acid-degradable aqueous gels comprising 7.5% as-received BET-E-40 vs. HCl concentration at about 23° C.
Figure 3:
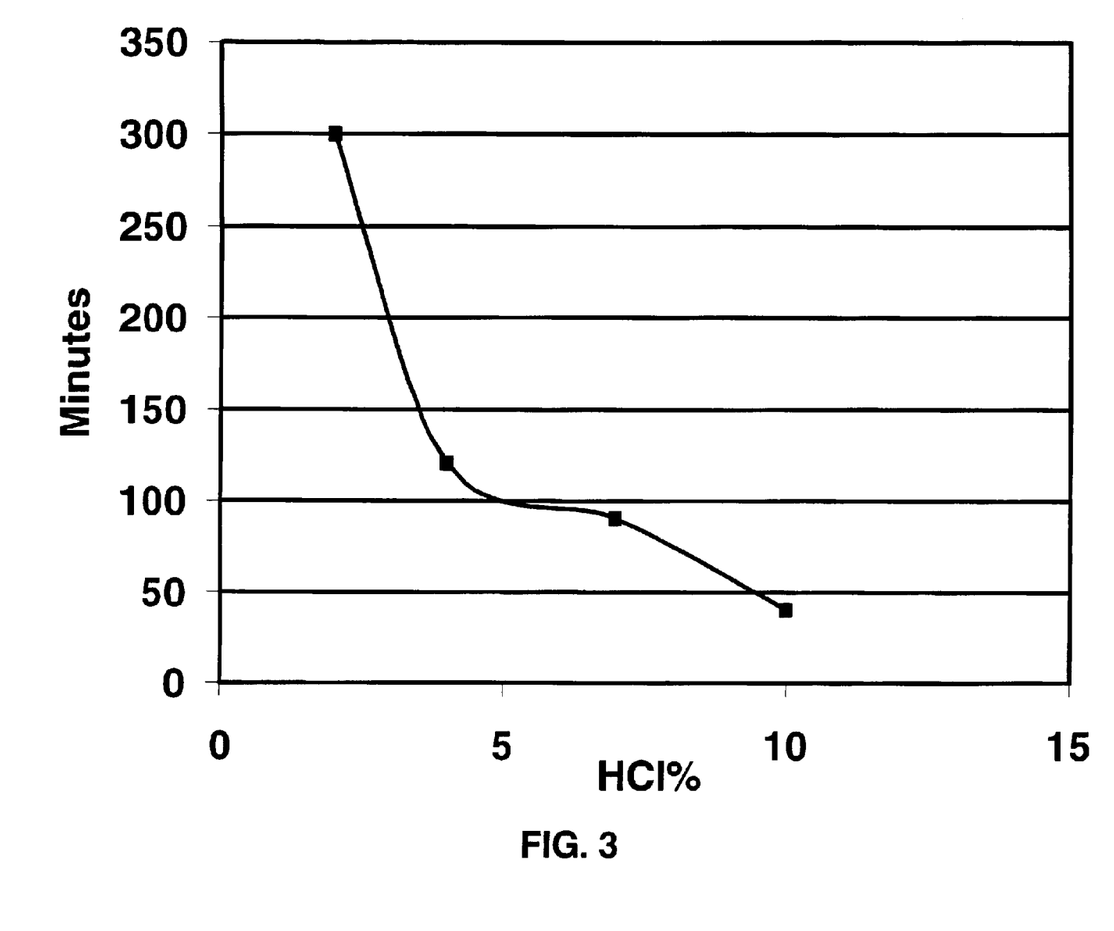
FIG. 3 shows the time at 88° C. for the viscosity of high-temperature acid-degradable aqueous gels comprising 7.5% as-received BET-E-40 having different acid concentrations to fall below about 50 cP at 170 $sec^{-1}$.
Figure 4:
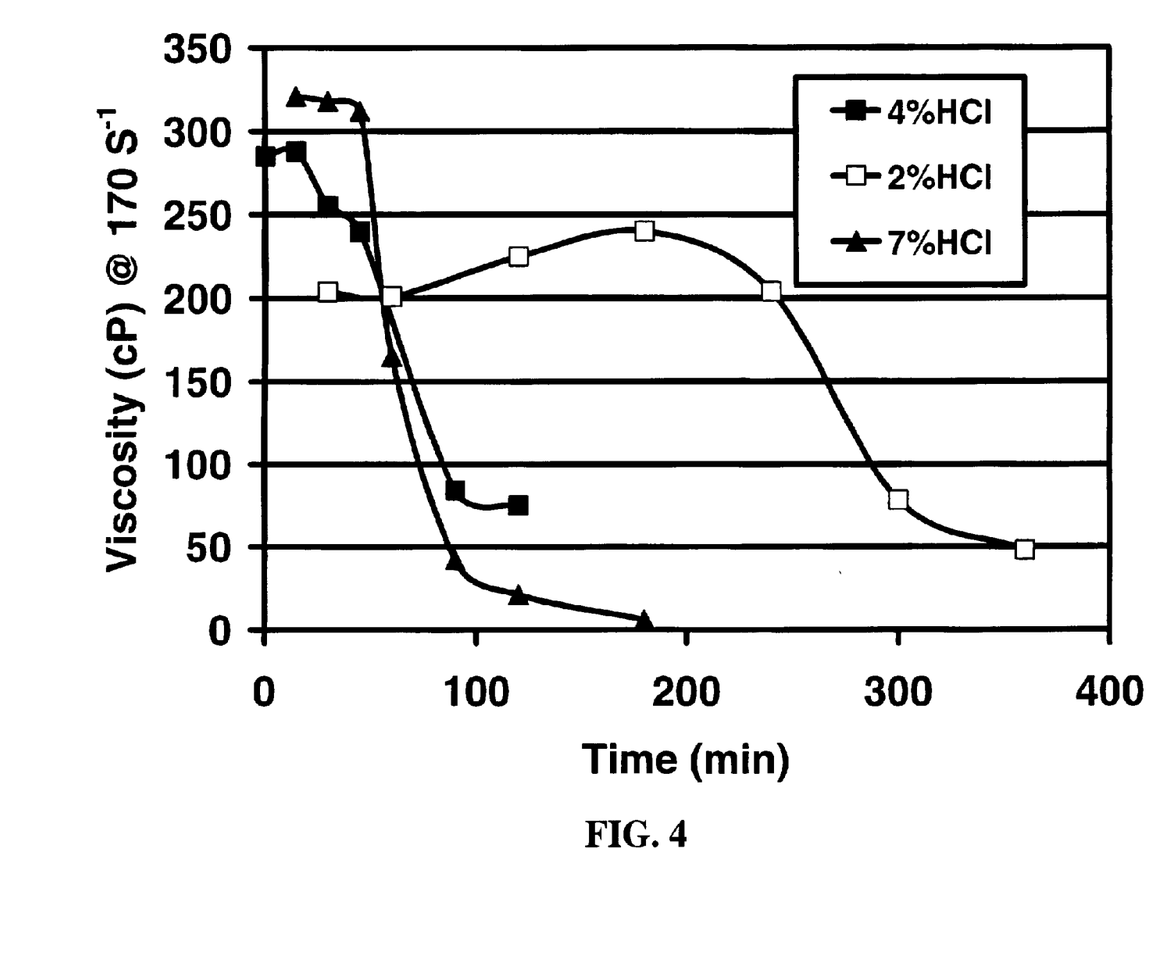
FIG. 4 shows the decrease in viscosity measured at 170 $sec^{-1}$ vs. time at 88° C. for high-temperature acid-degradable aqueous gels comprising 7.5% as-received BET-E-40 and differing acid concentrations.

The data in FIGS. 1 through 4 show how the viscosity of one viscous high-temperature acid-degradable aqueous gel varies with time, temperature and acid concentration. The gel was made with 7.5% as-received BET-E-40. FIG. 1 shows the initial viscosity of a gel made with 5% KCl and 2% HCl as a function of temperature; this gel is stable over a very broad temperature range, and would be useful at temperatures up to at least 150° C. The viscosity varies a little over the temperature range studied, which is not unusual for such systems, but is relatively constant. FIG. 2 shows the initial viscosity at ambient temperature of the same system (except without the KCl) over a very broad range of HCl concentrations. The variations are typical of such systems although the exact HCl concentrations at which the effects are observed would vary with different surfactants. This system gels in the absence of any added salt. As the HCl concentration is increased, the initial viscosity also increases up to a certain HCl concentration, in this case about 7. This is also typical of such systems. At increasingly higher HCl concentrations, the initial viscosity begins to decrease but is still above about 50 cP up to a fairly high HCl concentration, in this case about 17%. At even higher concentrations the viscosity is very low. FIG. 3 shows the time at 88° C. for the viscosity of four of the gels of FIG. 2, having different acid concentrations, to fall below about 50 cP, and FIG. 4 shows the decrease in viscosity as a function of time for the first three gels of FIG. 3. These data show how the stability and rate of degradation of such gels can be determined and controlled. At low acid concentrations the systems are strong stable gels; at intermediate acid concentrations the systems form more viscous stable gels that degrade at rates that increase with increasing acid concentration. At high acid concentrations, this particular system does not form a viscous gel.

What is claimed is:

1. A method of diverting fluid, injected in a well treatment of a stratified subterranean formation comprising at least one problematic hydrocarbon-containing zone and at least one non-problematic zone, into said problematic hydrocarbon-containing zone, comprising injecting a diverting fluid comprising an aqueous viscous gelled fluid comprising water, a gelling amount of a viscoelastic surfactant, and an acid, wherein the diverting fluid initially preferentially enters the non-problematic zone, thereby diverting subsequently injected fluid into said problematic zone, and wherein the acid decomposes the surfactant after the treatment.

2. The method of claim 1 wherein the decomposition comprises hydrolysis.

3. The method of claim 1 wherein the diverting fluid is salt free.

4. The method of claim 1 wherein the formation temperature exceeds 37° C.

5. The method of claim 1 wherein the surfactant has the following amide structure:

wherein R$_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 10 carbon atoms; and Y is an electron withdrawing group rendering the amide group difficult to hydrolyze.

6. The method of claim 5 wherein Y comprises a functional group selected from the group consisting of a quaternary amine, an amine oxide, and a carboxylic acid.

7. The method of claim 6 wherein the surfactant is a betaine having the structure:

wherein R is a hydrocarbyl group that may be branched or straight chained, aromatic, aliphatic or olefinic and has from about 14 to about 26 carbon atoms and may contain an amine; n=about 2 to about 10; and p=1 to about 5, and mixtures of these compounds.

8. The method of claim 7 wherein the surfactant is a betaine in which R is an alkene side chain having from about 17 to about 22 carbon atoms, n=about 3 to about 5, and p=1 to about 3, and mixtures of these compounds.

9. The method of claim 8 wherein the suffactant is a betaine having the structure:

wherein n=3 and p=1.

10. The method of claim 8 wherein the surfactant is a betaine having the structure:

wherein n=3 and p=1.

11. The method of claim 1 wherein the diverting fluid further comprises a cosurfactant.

12. The method of claim 1 wherein the diverting fluid further comprises an alcohol.

13. The method of claim 1 wherein the diverting fluid further comprises a chelating agent.

14. The method of claim 1 wherein the diverting fluid further comprises an iron control agent.

15. The method of claim 1 wherein the well treatment is hydraulic fracturing.

16. The method of claim 1 wherein the well treatment is acid fracturing.

17. The method of claim 1 wherein the well treatment is matrix acidizing.

18. The method of claim 1 wherein the well treatment is matrix dissolution with a fluid comprising a chelating agent.

19. The method of claim 1 wherein the non-problematic zone contains at least a residual amount of hydrocarbon and the method further comprises injecting a mutual solvent prior to injecting the diverting fluid.

20. The method of claim 19 wherein the mutual solvent is selected from the group consisting of low molecular weight esters, alcohols, and ethers.

21. The method of claim 20 wherein the mutual solvent is a low molecular weight ether.

22. The method of claim 21 wherein the mutual solvent is ethylene glycol monomethyl ether.

23. A method of fracturing a subterranean formation comprising injecting, at a pressure sufficient to fracture the formation, a fluid comprising an aqueous gelled fluid comprising a gelling amount of a viscoelastic surfactant and an acid wherein the acid decomposes the surfactant after the fracturing treatment.

24. The method of claim 23 wherein the fluid is injected as a pad.

25. The method of claim 24 wherein the fluid is injected as the fracturing fluid and further comprises a proppant.

26. The method of claim 23 wherein the fluid is injected as a pad and wherein the fluid is injected as the fracturing fluid, said fracturing fluid further comprising a proppant.

* * * * *